United States Patent [19]

Rogers

[11] Patent Number: 4,665,750

[45] Date of Patent: May 19, 1987

[54] UNDERWATER TRANSDUCERS

[75] Inventor: Leonard M. Rogers, Stockport, England

[73] Assignee: Avtaec Limited, Sheffield, England

[21] Appl. No.: 809,697

[22] Filed: Dec. 17, 1985

[30] Foreign Application Priority Data

Dec. 21, 1984 [GB] United Kingdom ................. 8432508

[51] Int. Cl.[4] ............................................. G01N 29/04

[52] U.S. Cl. .......................................... 73/587; 73/644

[58] Field of Search .......................... 73/587, 588, 644

[56] References Cited

U.S. PATENT DOCUMENTS

| | | | |
|---|---|---|---|
| 3,378,705 | 4/1968 | Bacon | 73/644 |
| 3,529,465 | 9/1970 | Kleesattel et al. | 73/587 |
| 3,921,442 | 11/1975 | Soloway | 73/644 |
| 4,461,177 | 7/1984 | Feng | 73/587 |

*Primary Examiner*—Anthony V. Ciarlante
*Attorney, Agent, or Firm*—Silverman, Cass, Singer & Winburn, Ltd.

[57] ABSTRACT

A transducer for sensing transient elastic waves in metallic components particularly in steel weldments below water on offshore structures comprises a piezoelectric sensing element (1) for coupling to the metallic component and shielded from noise arriving in directions other than the component by an elastomeric encapsulation (22) such as of aerated polyurethane.

5 Claims, 4 Drawing Figures

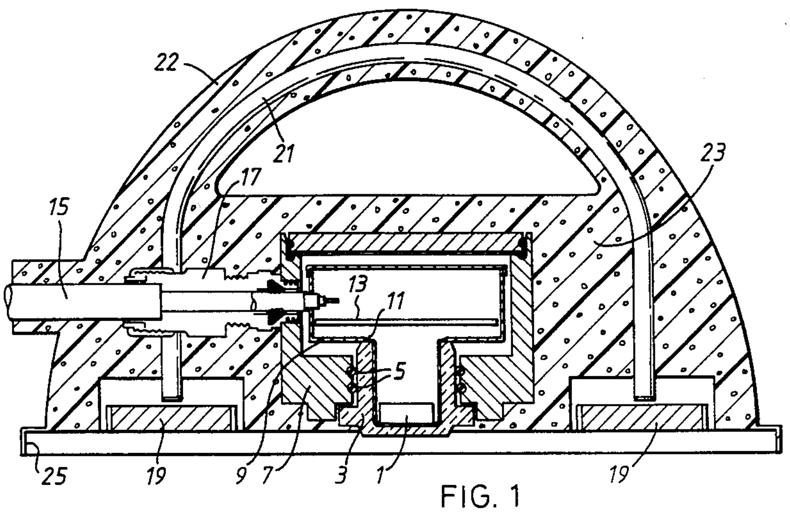
FIG. 1
FIG. 2
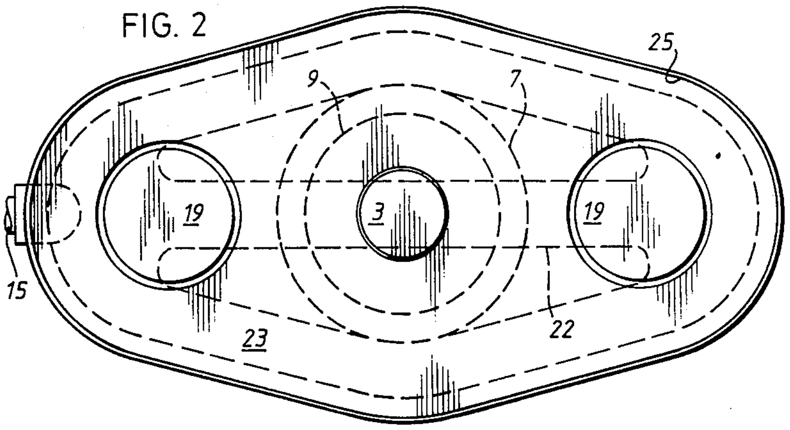

UNDERWATER TRANSDUCERS

This invention relates to transducers used for the sensing of transient elastic waves in metallic components and in particular to the detection of elastic waves originating from micro displacements associated with subcritical crack growth in the steel weldments of offshore structures below water.

In the past, transducers for such applications have not shown such good directionality and sensitivity as to warrant the analysis of elastic waves emanating from micro-displacements in underwater structures nor have they shown sufficient strength of attachment to be usable throughout the year in the 'splash zone'. In particular, ultrasonic methods of crack detection generally require extensive preparation of the structure and equipment in setting up transducers for single localised measurements and have proven impractical for underwater inspection of such structures.

This invention seeks to improve these features so as to make acoustic emission measurements below water on offshore structures viable.

According to the present invention, there is provided a transducer, for sensing elastic waves in a metal component, having a sensing head adapted to be coupled to the component, which is shielded from noise arriving in directions other than from the component, by an elastomeric encapsulation.

Preferably the transducer is provided with a flexible skirt for the exclusion of noise through gaps between the transducer and the component.

Preferably the transducer is provided with one or more magnets for attaching it to the component.

Preferably an adhesive is provided between the transducer and the component, the adhesive also acting as an acoustic couplant.

With these features, some or all of the following improvements are possible:

high sensitivity of response to the transient elastic waves generated in the structure by the propagating crack relative to compressional waves at the sensing frequency or higher frequencies present in the surrounding water i.e. is insensitive to interference from noise in the water originating from such sources as support vessel propulsion cavitation, wave splash, vessel location and communication sonar etc;

high durability and strength of attachment to the structure allowing measurements in the splash zone without need for straps, clamps or any ancillary attachment to the structure and good sealing of the gap created at the edges of the transducer when the transducer is attached to a curved surface such as a pipe, cylinder or tube, necessary to maintain the effectiveness of the shield against water borne noise, to inhibit corrosion of the magnets and to reduce adverse effects of habitation by marine animals and plant life.

Figure 3:
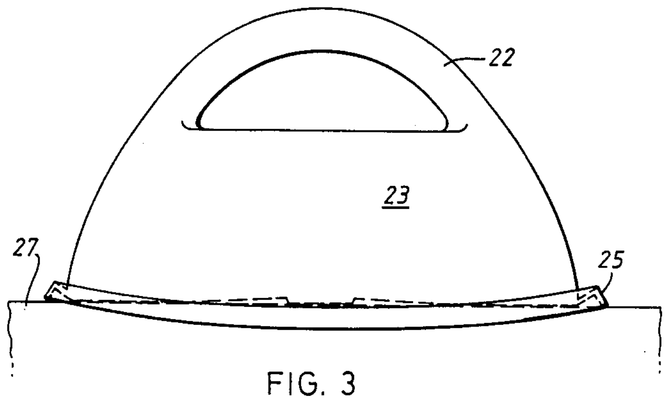
Figure 4:
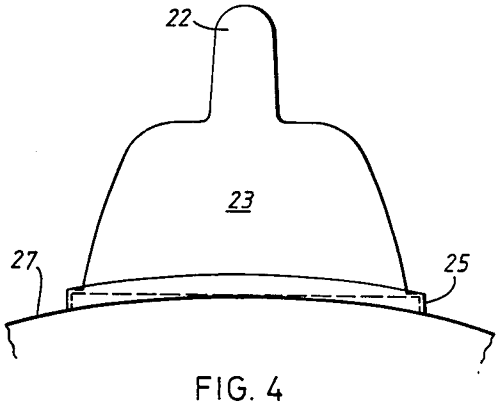

A preferred embodiment of the invention will now be described by way of example with reference to the accompanying drawings in which FIG. 1 is a cross section of a transducer according to the invention, FIG. 2 is a plan of a transducer according to the invention, FIG. 3 is a schematic diagram of a transducer according to the invention in side elevation attached to a tube, and FIG. 4 is a schematic diagram of the transducer and tube of FIG. 3 in end elevation.

Referring to FIG. 1, the transducer shown comprises:

a piezoelectric sensing element (1) of the PZT type, metalised on top and bottom faces with peak sensitivity in the frequency range 100 kHz–300 kHz; a ceramic shoe (3) of 96% alumina ceramic, metalised inside with copper and having a fused molybdenum base layer with a thickness as small as possible (less than 3 mm); a twin O-ring seal (5); a metallic housing (7) with a lid; a copper can (9) housing the sensing element (1) and circuitry and soldered at 11 to the inside of the shoe (3); a low-noise pre-amplifier (13) with a 40 dB gain, 100–300 kHz band pass filter and pulser driver circuit to facilitate operation in either sensing or pulsing (test) modes controlled from the measurement and recording instrumentation on the platform; an armoured superscreen cable (15); a gland (17) incorporating a glass to metal seal and compression joint for continuity of conductor screen while retaining electrical isolation of the screen from the housing (7) and cable armour, the whole gland being waterproof to 1000 psi; two samarium cobalt pot magnets (19), each producing 80 kg pull at 0 gap and 40 kg pull at 1 mm gap; a steel rod (21) supporting the two magnets (19) and strengthening the transducer handle (22) and polyurethane encapsulation (23) having a minimum thickness of 15 mm. The encapsulation (23) has a skirt (25) integral with it and surrounding the front face. The piezoelectric element (1), the amplifier (13) and their associated connections are totally shielded electromagnetically and the whole transducer can operate at 1000 psi hydrostatic pressure.

Referring now to FIGS. 3 and 4, a transducer is shown attached to a metal tube (27) such as a leg or member, in the shape of a cylinder, of an offshore oil production platform. In installing the transducer, the surface of the metal tube is cleaned and an underwater curing resin which acts as a sealant, adhesive, couplant and corrosion inhibitor, is extruded onto the front face of the transducer. This is best done in the dry but a hole can be provided through the polyurethane encapsulation to the front face for injecting the resin underwater while the front face is temporarily covered by a transparent polythene plate strapped to the transducer. The transducer is then placed on the clean metal such that its major axis is parallel to the major axis of the cylinder as shown. The magnets hold the transducer securely to the tube and once the resin has set, the joint is virtually permanent even in severe waves.

The operation is straightforward. High frequency (i.e. greater than about 100 kHz) acoustic emissions originating from propagating cracks in the tube or structure (27) pass through the thin layer of ceramic in the shoe (3) and cause the crystal (1) to vibrate at its resonant frequency. The electric signal produced by the crystal is amplified by the low noise, line-drive preamplifier which is standard in the art and the signal is conducted away by the cable (15). Power for the preamplifier is supplied by the same signal conductor and screen of the cable.

A suitable control signal from the cable can switch the transducer to test mode whereby acoustic signals can be emitted from the crystal (1) to be detected by other transducers in known manner.

A number of factors give rise to very good contact between the ceramic shoe (3) and the tube (27). The shoe (3) protrudes about 1 mm beyond the flat front face of the transducer facilitating a strong positive pressure on the shoe by the structure due to elastic resilience of the polyurethane molding when the transducer is pulled onto the surface of the tube by the magnets (19). The resin couplant fills pitholes in the surface of the metal under and around the ceramic further improving the acoustic coupling. Resin is more practical than conventional grease for this purpose and proves to be a better couplant.

A number of factors also give rise to good noise rejection at the transducer. The polyurethane encapsulation (23) gives good acoustic shielding of the sensor from water borne compressional waves at the operating frequency usually greater than 50 kHz. The skirt (25) forms an enclosure for the contact face of the transducer and the structure below, further shielding against water borne noise, and the sealant aids this function.

It is highly desirable that the elastomeric encapsulation (the polyurethane) be provided with additional means to improve acoustic shielding. This may be accomplished by including layers of acoustic barrier material within the encapsulation. However, a very convenient method of emparting high acoustic shielding properties to the polyurethane is to inject gas into it during manufacturing (e.g. by aeration) so that it cures as a closed cell structure, the cells being surrounded by relatively thick walls to retain mechanical integrity in use under water. Typically the bubbles (the closed cells) have average diameters of about 0.25 mm separated about 3 mm apart. (These are of course approximate figures as the cells are randomly dispersed in the encapsulation). Aeration may be achieved by extruding degassed polyurethane precursor and curing agent into a mixing chamber and introducing air under pressure therein. The aerated mixture is then forced into a mould of appropriate shape to cure. The degree of aeration and cell size may be controlled by trial and error by varying the air pressure and the rate of flow of materials into the mixing chamber and the mould.

These features result in a transducer having extremely good directionality and the sensitivity of the front face of the transducer can be greater than 30 dB with respect to the exposed encapsulation surface.

It will of course be understood that the present invention has been described above purely by way of example, and modifications of detail can be made within the scope of the invention as defined in the appended claims.

I claim:

1. A transducer for sensing elastic waves in a metal component, comprising a sensing head adapted to be coupled to the component with a surface of said head facing said component said sensing head being surrounded on all sides except said surface by an outer cellular elastomeric encapsulation having a closed cell structure, the periphery of said encapsulation adjacent said surface being provided with a flexible skirt.

2. A transducer according to claim 1 further having one or more magnets for attaching it to the component.

3. A transducer according to claim 1 further being provided with an adhesive between the transducer and the component, the adhesive also acting as an acoustic couplant.

4. A transducer according to claim 1 wherein the elastomeric encapsulation is made of polyurethane and the minimum thickness of polyurethane between the sides of the sensing head, not adapted to be coupled to the component, and the exterior, is 15 mm.

5. A transducer according to claim 1 wherein said closed cell structure is obtained by injecting gas into the elastomer prior to curing.

* * * * *